United States Patent [19]
Inoue

[11] Patent Number: 5,354,349
[45] Date of Patent: Oct. 11, 1994

[54] METHOD FOR MANUFACTURING OF ORGANIC FERTILIZERS

[76] Inventor: Satoshi Inoue, 1214, Oiso, Oiso-Machi, Naka-Gun, Kanagawa, Japan

[21] Appl. No.: 858,946

[22] Filed: Mar. 27, 1992

[30] Foreign Application Priority Data

Mar. 28, 1991 [JP] Japan .................. 3-090057

[51] Int. Cl.⁵ .............. C05F 9/04; C05F 11/08
[52] U.S. Cl. .............................. 71/9; 71/12; 71/14; 71/15; 71/23
[58] Field of Search .................. 71/8–9, 71/12, 14, 21, 23, 15

[56] References Cited

U.S. PATENT DOCUMENTS 4,050,917  9/1977  Varro ...................... 71/14 X
4,342,830  8/1982  Holloway ................. 71/14 X

FOREIGN PATENT DOCUMENTS 0445102  9/1991  European Pat. Off. .
2156888  6/1973  France .
2-120289  5/1990  Japan ...................... 71/9
8001803  9/1980  World Int. Prop. O. .

Primary Examiner—Ferris Lander
Attorney, Agent, or Firm—Wenderoth, Lind & Ponack

[57] ABSTRACT

There is provided a continuous method for manufacturing of organic fertilizers by fermentation of a waste containing organic materials or mixture of said waste with cellulose-containing organic materials in the presence of thermophilic and aerobic microorganisms comprising the steps:

a. adjusting the moisture content of said waste or mixture to 45–65 wt %, b. shearing and kneading said waste or mixture at a temperature elevated to 40° C.–90° C. by the pressure and friction of said shearing and kneading, whereby thermophilic microorganisms are caused to be activated, and c. pulverizing the thus-treated waste or mixture while contacting it with air, whereby said aerobic microorganisms are caused to be activated, the improvement which comprises subjecting a part of the product of step c. to fermentation by thermophilic microorganisms at a temperature of higher than 40° C. for more than 5 hours, and recycling the thus treated product with fresh raw materials to step a., the recycled amount of product of step c. being 5 to 60 weight % of the total amount of manufactured product.

3 Claims, 5 Drawing Sheets

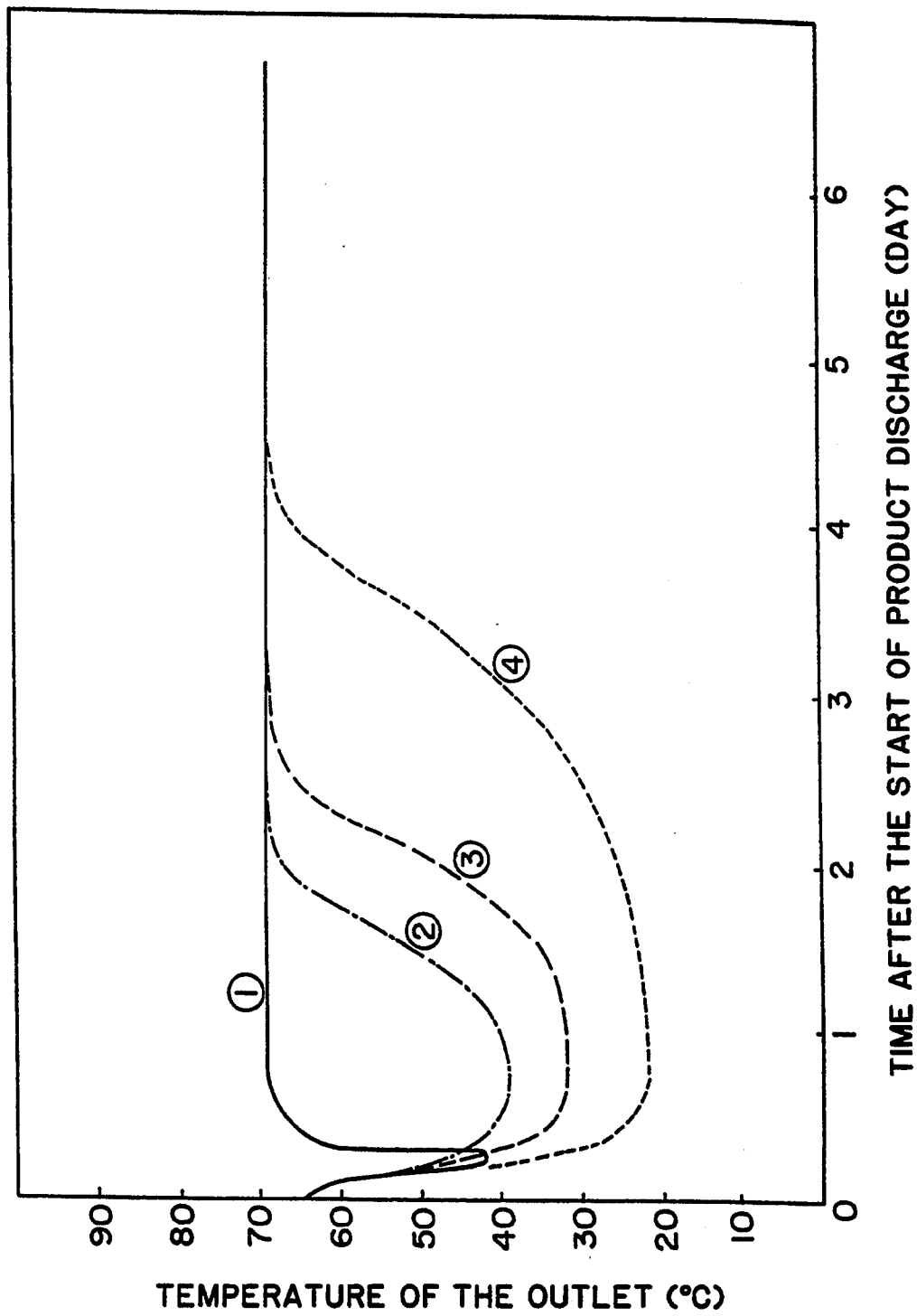

METHOD FOR MANUFACTURING OF ORGANIC FERTILIZERS

SPECIFICATION

1. Title of the Invention Method for manufacturing of organic fertilizers

2. Background of The Invention

The present invention relates to an improved method for manufacturing organic fertilizers by artificial treatment of livestock excrements, such as swine-, chicken-, cattle- manures, sewage disposal sludge, such as living draining sludge or mixture of said wastes with cellulose-containing organic materials such as grasses, hulls, straws, woodchips, etc. into organic fertilizers without bad odor within a short time.

An enormous quantity of excrement exhausted from the large-scale livestock industry are left as such due to lack of appropriate treating methods, and environmental pollution caused by bad odor and discharge thereof without treatment has created a social problem.

In general, it requires 5–6 months to compost excrements of chicken, cattle, swine, etc., and cellulose-containing coarse organic materials used as beds thereof, such as grasses, straws, hulls, woodchips, etc. by leaving them as such in nature. This is very inefficient and generates bad odors during that period. It has also been difficult to obtain evenly fermented compost of good quality because of unevenness in fermentation between the surface and interior parts.

3. Description of The Prior Art

In order to solve the above mentioned problem, an inventor of this invention proposed method for manufacturing of organic fertilizers, which comprises adjusting moisture content, to a range of 45%–65 wt %, of a waste containing organic materials or mixture of said waste with cellulose-containing organic materials, shearing and kneading them under an elevated pressure at a temperature elevated to 40° C.–90° C. by the pressurization and friction, releasing them from the state of elevated pressure, followed by pulverizing the thus-treated mixture while contacting with air, and device suitable to carry out the method (International Publication No. WO92/00259).

Although this method has succeeded in manufacturing of a high quality compost in a short time, it takes long time to reach a desired temperature in spite of a rise of temperature by heat of compression and heat of friction by mixing friction in a treatment tank, and unstable conditions continues in manufacturing an organic fertilizer by this method, and during this period there is some fear of a bad odor caused by psychrophilic microorganisms and the like which are unfavorable to manufacturing compost. Besides, various kinds of raw materials are used in this method, and moreover change of raw materials occurs frequently. Therefore, it takes some time to stabilize the conditions such as temperature and so forth which are optimal for activities of microorganisms, and there are difficulties in maintaining a stable operation in the case that the raw materials are changed.

Then, as a result of a study on improving the above mentioned invention to operate steadily in a short time, the inventor found that desired temperature can be reached in a short time. Thus, it becomes possible to operate very stably, bad odors can be suppressed, and consequently a good quality compost can be produced. This is achieved by recycling a part of processed mixture discharged from the treatment tank and left under a specific condition to be further fermented, to the treatment tank for recycling-treatment mixed with fresh raw materials, and on this basis finally completed this invention.

4. Summary of The Invention

The present invention is an improvement of the method for manufacturing of organic fertilizers previously proposed by the inventor, characterized by adjusting moisture content to a range of 45%–65 wt %, of a waste-containing organic materials or mixture of said waste with cellulose-containing organic materials, shearing and kneading them under an elevated pressure at a temperature elevated to 40° C.–90° C. by the pressurization and friction, releasing them from the state of elevated pressure, followed by pulverizing the thus-treated mixture while contacting with air.

The improvement according to the present invention comprises subjecting a part of processed mixture discharged from the treatment tank to fermentation by thermophilic microorganisms at a temperature of higher than 40° C. for more than 5 hours after discharging, and recycling this product to tile treatment tank and treating there mixed with fresh raw materials, and the recycled amount of said processed mixture being 5 to 60 weight % of the total amount of manufactured product.

5. Description of The Preferred Embodiment

As a waste containing organic material which can be a raw material of this invention, livestock excrements such as cattle manure, chicken manure, swine manure, sewage disposal sludge, living drainage sludge, food industry drainage, sewage sludge such as livestock excrements sludge, or a wet garbage, an algae, the aquatic plants such as seaweeds can be shown, but especially, the livestock excrement sewage sludge, and wet garbage are desirable. These can be used alone or can be mixed with cellulose-containing organic materials. As the cellulose-containing organic materials, grasses, straw, hulls, wood chips, bark and so on can be used favorably.

In order to ensure accelerated fermentation, a better result is obtained by adjusting pH of a mixture with a pH-adjusting agent in order that pH value during the fermentation process should be in a range of pH 6–9, as well as adjusting moisture content of a mixture of livestock excrements and cellulose-containing organic materials, such as grasses, straws, hulls, woodchips, etc. to 45–65%, and this pH-adjusted mixture is sheared and kneaded under elevated pressure and temperature thereof is increased to 40°–90° C. by compression and friction caused by kneading, then the treated mixture is released from the compressed state with exposure to air.

In this invention, organic fertilizer is produced by fermentation by microorganisms, and as the microorganisms, thermophilic and aerobic microorganisms are favorable. The fermentation by psychrophilic microorganisms, mesophilic microorganisms or anaerobic microorganisms generates a bad odor, and also in case that these microorganisms exist in the product, rotting or another undesirable phenomena as fertilizers take place, such as the generation of substances harmful to plants due to secondary fermentation.

Optimum temperature ranges for microbial activities are 50°–70° C. for thermophilic microorganisms, 30°–40° C. for mesophilic microorganisms, 10°–20° for psychrophilic microorganisms. At the temperature exceeding these temperature range beyond by 15°–20°C., their growth is hindered, however, their spores are often dormant without being destroyed at such high temperature. Therefore, even if the process of manufacture is conducted at a high temperature, when moderate moisture is present, the temperature is lowered, and ventilation by air is shut off after being packed as product. Thereby, psychrophilic microorganisms, mesophilic microorganisms, or anaerobic microorganisms are activated and there is a fear that secondary damage may occur.

According to the present invention, psychrophilic microorganisms and mesophilic microorganisms can be destroyed by shearing and kneading of the raw materials under elevated pressure by dint of pressurization and friction.

That is to say, in the present invention, temperature of raw materials is elevated 40°–90° C. by means of mechanical compression and kneading, and by means of elevated pressure, hot water can penetrate into inside of raw materials, psychrophilic microorganisms and mesophilic microorganisms are destroyed as the result of destruction of their spores due to penetration of hot water and friction. Accordingly, aerobic and thermophilic microorganisms are activated by physical and thermal stimulation, and cellulose-containing organic materials are crushed into small fragments by the compression and kneading. Therefore, livestock excrements, and so on, which are the main nutrients for microorganisms, are evenly distributed, thus, the microorganisms are activated in a circumstance where conditions for growth thereof, such as temperature, moisture, etc., are even, therefore, all microorganisms start their activities simultaneously and ferment the raw materials within a short time. In such a case, thermophilic microorganisms propagate quickly in the primary treatment tank and number of psychrophilic microorganisms become almost extinct. In the secondary treatment tank, aerobic microorganisms propagate abruptly since treated material has been released from the compressed state and pulverized, accordingly anaerobic microorganisms decrease relatively in number.

Thus, thermophilic microorganisms and aerobic microorganisms, which are useful for fermentation, are activated and propagate quickly, and since psychrophilic microorganisms and anaerobic microorganisms which cause bad odor decrease, by shearing and kneading of the raw materials under an elevated pressure and pulverizing them while contacting with air, composts of good quality and without bad odor can be manufactured within a short time.

Therefore, in the present invention the temperature of the primary treatment tank is maintained at 40°–90° C., preferably at 50°–70° C. In the primary treatment tank, temperature is elevated and maintained at said range by pressurization and kneading, as the raw materials are sheared and kneaded under elevated pressure there.

Range of optimum pH for propagation of important microorganisms for the fermentation, such as cellulose-decomposing microorganisms, is 6–9 and the most optimum pH is 7–8. The value of pH of raw materials can be too low due to production of organic acids during the fermentation and the pH can be too high due to presence of excess ammonia, and both cause delay in fermentation. This problem can be resolved by prior pH adjustment with the addition of a pH-adjusting agent in order that pH value during fermentation will be within a range of pH 6–9. Besides, fertilizing ability of the products can be improved by the use of a pH-adjusting agent which is a fertilizer as well.

As such pH-adjusting agent, ammonia or calcium-containing compounds which can also be used as a fertilizer too, such as calcium silicate, lime nitrogen, quick lime, slaked lime, calcium carbonate, magnesia lime and, are suitable. Magnesia quick lime can be used when pH is too low, and a phosphorus fertilizer such as liquid phosphoric acid, super phosphate of lime and tripple super phosphate of lime can be used when pH is too high pH-adjusting agents can be added simultaneously with or after adjusting moisture content.

In this invention, recycling of a part of processed mixture constitutes a characteristic feature thereof, that is, a part of processed mixture (hereafter called a recycled raw materials) which is discharged from the treatment tank and left under the conditions of fermentation by thermophilic microorganisms at a temperature of higher than 40° C. for more than 5 hours further after being discharged from a treatment tank is returned to the treatment tank to with fresh raw materials.

The recycled raw materials are kneaded at a high temperature and under compression in a treatment tank, and then, the thermophilic and aerobic-microorganisms which are beneficial for the fermentation are proliferated rapidly. After being discharged from the treatment tank under these conditions, the fermentation proceeds under a suitable surrounding where organic fertilizer is produced and cellulose is decomposed by thermophilic microorganisms at a temperature condition of higher than 40° C. for more than 5 hours. A stable reaction starts from the beginning by recycling a part of it and mixing with fresh raw materials. Namely, the recycling makes fermentation in the treatment tank constant by the repetition of kneading under high pressure and at high temperature (physical stimulus), crushing, oxidation, and consequently, the microorganisms useful for this fermentation are screened, moreover, the screening lotifies the microorganisms, which have vigorous activity and proliferate rapidly, and so, have a function to suppress the different kinds of microorganisms existing in a fresh raw materials, and afterward, the fermentation is constantly stabilized quickly showing the same pattern. Without recycling, the conditions fluctuate widely according to the outdoor temperature. When the outdoor temperature is low, the heating means such as hot air are required in order to maintain stable operation, but in case of the recycling operation, there is little fluctuation caused by the outdoor temperature. Moreover since a bad odor derived from raw materials is easily decomposed by the function of the endo-enzyme and/or exo-enzyme of microbial cell contained in the recycled raw materials, this has a great effect to suppress the generation of a bad odor.

As a recycled raw material, processed mixture discharged from the treating tank and left under the conditions of fermentation by thermophilic microorganisms at the temperature of higher than 40° C., preferably higher than 50° C. for more than 5 hours preferably for more than 24 hours after being discharged from a treatment tank is used. In discharged processed mixture left as is, or left under the condition of lower than said range of temperature or time, fermentation by thermophilic microorganisms is insufficient, so they are not suitable for recycled raw material to stabilize operation. The product left for a further long time can be used as a recycled raw material, but the product wherein fermentation is completed and the temperature of which falls down to less than 30° C. is not preferable, because the effect of recycling is small.

The recycled amount of processed mixture is 5 to 60 weight % of the total amount of manufactured product, especially 10 to 30 weight % is preferable.

Less than 5 wt %, recycling effect is not sufficient. When more than 60% is recycled, the effect is nor so increased, and an operation with such a large amount of recycling is not economical as the energy consumption required for recycling is increased.

This invention comprises of two processes, the one, of shearing and kneading the raw material mixture of organic fertilizers under an elevated pressure at the temperature elevated to 40° C.–90° C. by the pressurization and friction, and the other, of releasing them from the state of elevated pressure and pulverizing the thus-treated mixture while contacting with air.

The device which operates the process of this invention comprises a primary treatment tank, a secondary treatment tank and a fermentation box for further fermentation to make the discharged product from the secondary treating tank to the product and the recycled raw materials.

In the device the front end of a cylindrical primary treatment tank having a hopper for feeding raw materials is connected to the rear end of a cylindrical secondary treatment tank which is equipped with an outlet at the front end, through an open close gate.

The primary treatment tank is equipped with a screw conveyor for compression and transportation and a system for shearing and kneading inside, and the secondary treatment tank is equipped with rotary blades for crushing, and at the rear end thereof, is equipped with a blower.

Thus, the raw materials can be treated and taken out as a processed mixture after a single treatment by a series of devices.

An outline of the device for practicing the present invention is explained with the attached drawings below.

As shown in FIG. 1 and FIG. 3, the device for manufacturing organic fertilizers consists of a cylindrical primary treatment tank (1), and a cylindrical secondary treatment tank (2), connected through an open/close gate (3).

As shown in FIG. 1, FIG. 2 and FIG. 4, the primary treatment tank is composed of cylinder (1)' which is equipped with a hopper (4) for imput of raw materials on one end and an opening (5) connected to an open/close gate (3). And within the cylinder (1)', a screw conveyor (7) driven by a motor or a similar driving system (6) and a shearing/kneading system (8) are equipped.

The fresh raw materials and the recycled raw materials are fed from a feeding hopper (4a) of the fresh raw materials and a feeding hopper (4b) of the recycled raw materials respectively, transported to the primary treatment tank (1) through a hopper (4), and mixed homogeneously there.

As the screw conveyor (7) transports while compressing the raw materials fed to the hopper (4) toward the open close gate (3), it is desirable to provide a secondary screw (7b) which rotates in the reverse direction to that of the primary screw (7a). This secondary screw is provided close to the opening (5) of the primary treatment tank faced to the primary screw (7a), so as to play a role to further compress the raw materials having been transported and compressed by the primary screw (7a).

The shearing/kneading system (8) is equipped next to the primary screw (7a), in other words, between the primary screw (7a) and the secondary screw (7b).

The shearing/kneading system (8) consists of blades in plural number, which is rotated by a driving system such as a motor, and fixed blades (8b) projecting into the primary treatment tank corresponding to the rotary blades (8a).

The fixed blades (8b) promote shearing of raw materials by means of grinding with the rotary blades (8a) and prevent co-rotating of the raw materials with the rotary blades (8a), and also act as baffle boards for compressed transportation of the raw materials. The fixed blades, therefore, are preferably provided in the primary treatment tank with a screw driving system or similar thereto in order that the fixed blades (8b) can be driven forward and backward, which enables control of temperature, caused by compression and friction, by adjusting the height of the fixed blades (8b).

As shown in FIG. 1, FIG. 3 and FIG. 4, the secondary treatment tank (2) consists of a cylindrical tank (2') which has an entrance (9), connected to the aforesaid open close gate (3), on one end, and an outlet (opening for taking our of products) (10) on the other end. Within the cylinder (2'), rotary pulverizing blades (11) which drive the treated materials toward the outlet (10) while pulverizing the treated materials are provided, and a blower (12) for taking air into the cylinder is provided at the side of the entrance (9).

In the drawings shown as an example, both the rotary pulverizing blades (11) and the blower (12) are on the same rotary shaft driven by a moter (13). In the drawings, (14) is an opening for air intake for the blower (12).

In a few fermentation boxes (17), which stock the discharged product from outlet (10), fermentation further proceeds and a part of the product is recycled.

Fermentation box (17) has the structure as FIG. 5, comprises side plates (18) and a bottom plate (19), and the upper part is open. The bottom plate is a steel plate having fine holes. When the treated producted is charged, the activity of aerobic microorganisms preceeds as air flows from the bottom by the natural convection caused by holding heat of the contents.

The method of the present invention to manufacture compost using the device shown by the drawings is as below.

First of all, livestock excrements, such as swine-, chicken-, cattie-manures, sewage disposal sludge, such as living draining sludge or mixture of said wastes with cellulose-containing organic materials such as grasses, hulls, straws, woodchips(preferably those having used as livestock beds) are employed as raw materials (15), and moisture content thereof is adjusted to 45° to 65%, and the moisture-adjusted raw materials (15) are fed to the primary treatment tank (1) through the hopper (4).

The raw materials (15) are transported by the primary screw (7a) of the screw conveyor (7), and finely crushed by the shearing/kneading system (8) on the way, where the shearing/kneading system, particularly the fixed blades (8b) thereof play a role as baffle boards.

The raw materials transported by the primary screw (7a) are sheared and kneaded while being compressed, therefore, temperature is elevated quickly due to heat of compression and heat of friction. In this case, intensity of kneading friction, quantity of raw materials to be transported etc., can be adjusted by adjusting the projection length of the fixed blades (8b), and the temperature can further be elevated by elevating the internal pressure by equipping with the secondary screw (7b).

Thus, the temperature of raw materials (15) in the primary treatment tank (1) is elevated by compression and kneading, and mechanical and thermal stimulations activate microorganisms, therefore, fermentation is performed homogeneously and accelerated. Therefore, thermophilic microorganisms propagate because of the elevated temperature, and psychrophilic microorganisms decrease in number, and as a result, bad odor is repressed.

Adjustment of the open/close gate (3) regulates discharge of the treated materials whereby internal pressure and temperature are adjusted. Thus, the materials treated in the primary treatment tank by means of compression and kneading is heated to 40°–90° C. and discharged through the open close gate (3).

The high temperature materials discharged through the open/close gate (3) are transported into the secondary treatment tank (2), and because the treated materials are pulverized by high-speed rotary blades in the secondary treatment tank (2) while being contacted with air, where the treated materials are evenly exposed to oxygen. And as a result, aerobic microorganisms are activated and grow rapidly and accelerate fermentation, by which bad odor is further repressed because of decrease in number of anaerobic microorganisms.

According to this invention, bad odor is slight already in the discharging stage from the secondary treatment tank and working circumstance is greatly improved.

The treated mixture which is pulverized under pressure is discharged from the outlet (10). The discharged processed mixture is ordinarily transmitted to open fermentation box (17) and left to stand for a few days.

During this time, processed mixture is fermented by thermophilic and aerobic microorganisms activated by the air penetrated through fine holes of bottom plate (19).

A certain amount, for example, the amount manufactured in one day of the products is stored in each fermentation box. Most of them, which are left to stand for certain period, for example, 5 days are shipped as a product, a part of them are fed into the hopper as recycled raw materials (4b), mixed with fresh raw material in the hopper (4), and supplied into tile primary treatment tank (1).

EXAMPLES

Comparative Example 1

1000 kg/day of sewage disposal sludge and 200 kg/day of hulls as raw materials are added with water, by adjusting moisture content to 50%, fed into the primary treating tank (1) from hopper (4) of the device shown in FIG. 1 and started operation of manufacturing organic fertilizer. The temperature goes up by the heat of compression and heat of friction. Aqueous ammonia is added as a pH conditioner to maintain pH 7–8 at the pressure of 2 kg/cm$^2$ in the primary tank (1).

The product mixture treated in the primary treating tank at high temperature is discharged from open/close gate (3) and released from the elevated pressure, transported to the secondary treating tank. Under the contact with air, the treated mixtures are pulverized with high speed rotary blades. Pulverized treated mixtures are discharged from outlet (10).

Operating at the condition of the open air temperature 26° C., 17° C., and 8° C., changes in the outlet temperature are measured after the discharge of the product began. Results are shown in FIG. 6.

In FIG. 6, curve ② shows the operating result at the air temperature of 26° C., curve ③ shows at 17° C., curve ④ shows at 8° C., respectively.

The outlet temperature fall down after starting of product discharge, after that, goes up and stabilizes at about 68° C. But it takes long time to reach the stable state. Especially when the open air temperature is low, a longer time is required for the stabilization of the temperature.

Example 1

A portion of the processed mixture discharged for one day in the comparative example is transported to a fermentation box (17), where further fermentation-treated by maintaining the temperature at 60° C. for 5 days. 200 kg/day of above-said fermentation-treated products in the fermentation box corresponding to 20 wt % of the total product is fed into the primary treatment yank (1) through hopper (4b), where it is mixed with fresh raw material fed from hopper (4a). And manufacturing of the organic fertilizers is conducted similarly to that in the comparative example 1.

Recycling operation is done under the conditions of open air temperature of 8° C., change in the outlet temperature after the beginning of product discharge is measured. Results are shown in FIG. 6 ( curve ① ). Even though the air temperature was low, the outlet temperature was stabilized at 68° C. after 8 hours, thereafter almost constant temperature is remained.

6. Effect of The Invention

Apparently from FIG. 6, according to this invention, a part of the processed mixture discharged from the treating tank and further fermented is recycled so that stable operation can be attainable in a short time after the reaction starts to maintain stable condition. Therefore, composting can be accomplished in short time and compost of homogeneously good quality can be attained.

In the present invention psychrophilic microorganisms and anaerobic microorganisms which cause bad odor are extraordinarily decreased, and the treated mixture can be discharged without bad odor and outflow of sewage.

As a result of the above, the present invention can contribute greatly to the prevention of pollution and to improvement of living environment.

BRIEF DESCRIPTION OF THE DRAWINGS

FIG. 6 is a time course plots of temperature of Outlet in the process of the present invention and another process without recycling the raw materials.

Figure 1:
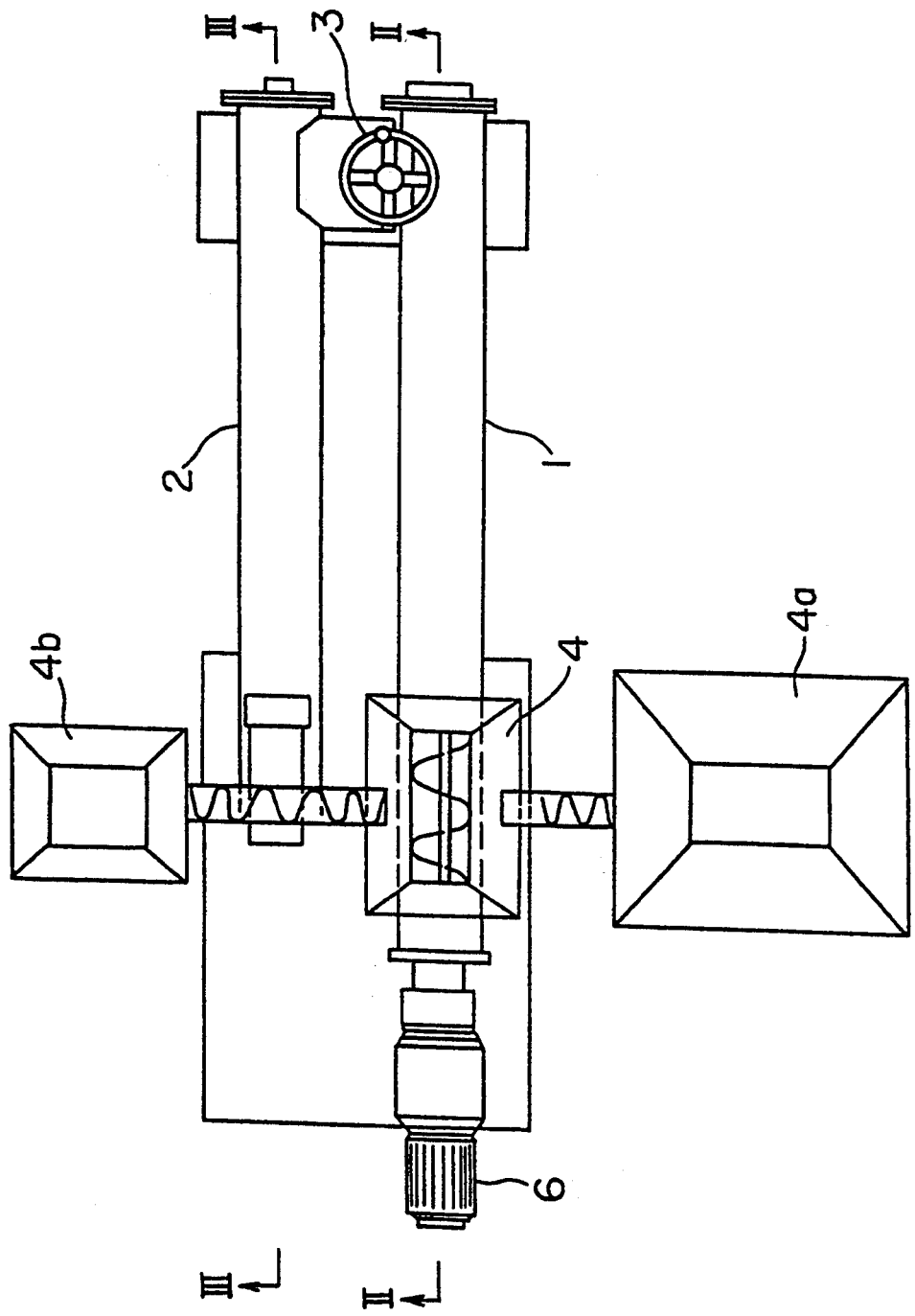
FIG. 1 is a plane view of the device for manufacturing of organic fertilizer of the present invention.
Figure 2:
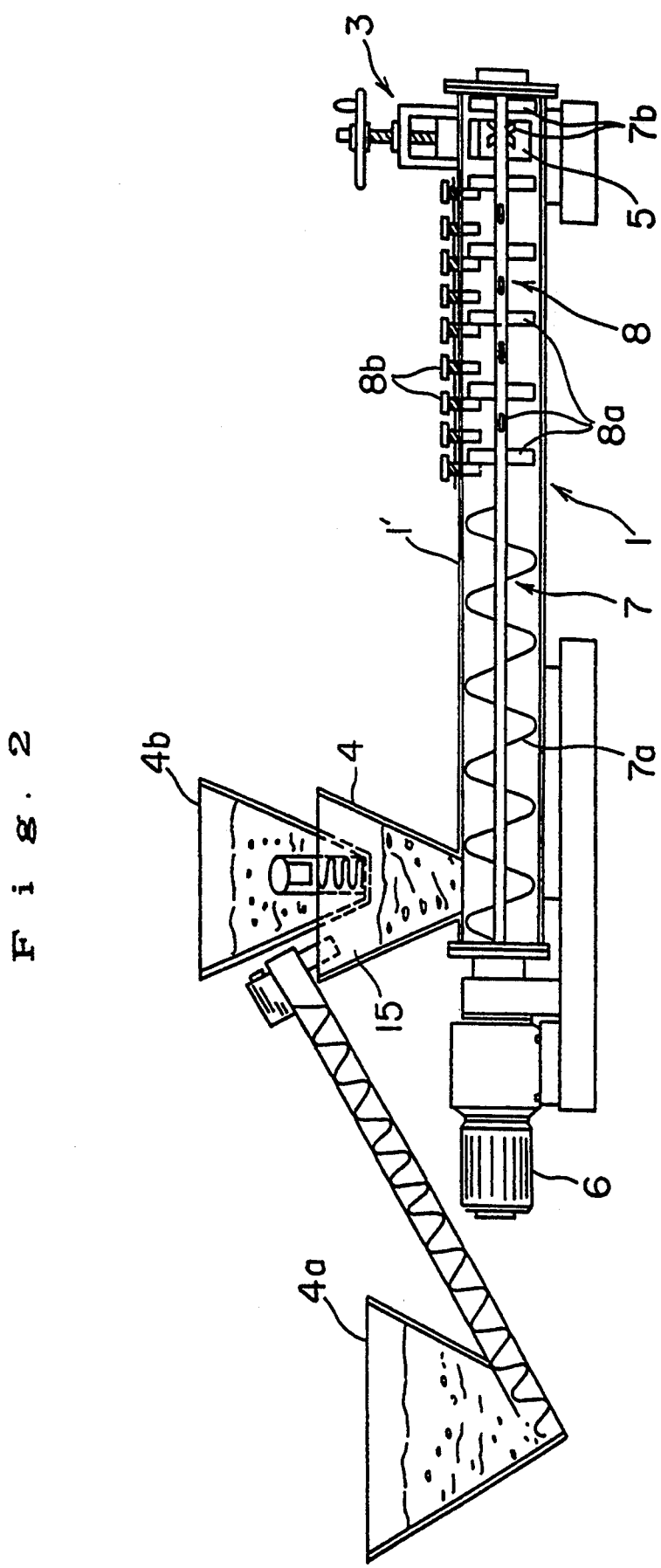
FIG. 2 is a cross section along the line II—II of FIG. 1.
Figure 3:
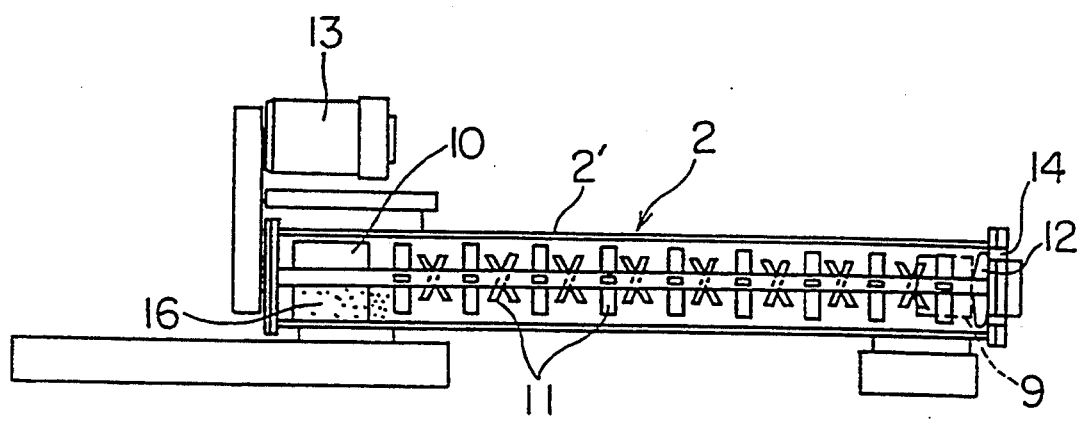
FIG. 3 is a cross section along the line III—III of FIG. 1.
Figure 4:
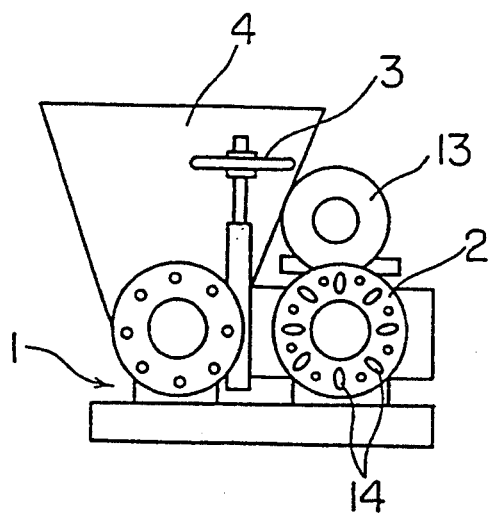
FIG. 4 is a right-side elevation view of FIG. 1.
Figure 5:
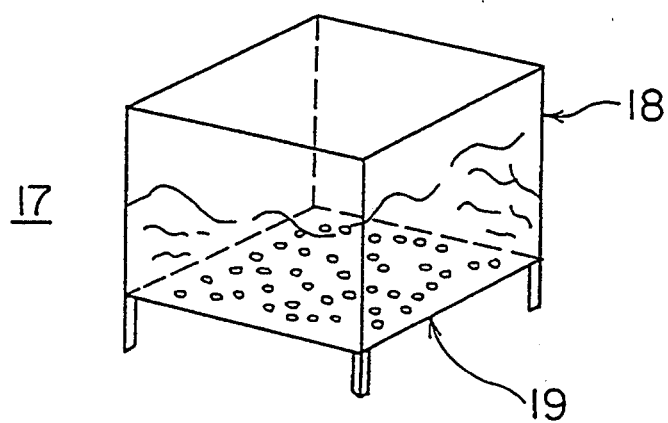
FIG. 5 is a sketch of fermentation box.

1: Primary treatment tank.
1': cylinder.
2: Secondary treatment tank.
2': cylinder.
3: Open/close gate.

4: Hopper.
4a: Hopper for fresh raw materials.
4b: Hopper for recycling materials.
5: Opening.
Driving system.
7: Screw conveyor.
7a: Primary screw.
7b: Secondary screw.
8: Shearings kneading system.
8a: Rotary blades.
8b: Fixed blades.
9: Entrance.
10: Outlet.
11: Rotary pulverizing blades.
12: Blower.
13: Motor.
14: Opening for air.
15: Raw materials.
16: Processed mixture.
17: Fermentation box.
18: Side plate.
19: Bottom plate.

I claim:

1. In a continuous method for manufacturing organic fertilizers by fermentation of a waste containing organic materials or mixture of said waste with cellulose-containing organic materials in the presence of thermophilic and aerobic microorganisms comprising the steps:
   a. adjusting the moisture content of said waste or mixture to 45–65 wt %,
   b. shearing and kneading said waste or mixture at a temperature elevated to 40° C.–90° C. by pressure and friction of said shearing and kneading, whereby thermophilic microorganisms are caused to be activated, and
   c. pulverizing the thus-treated waste or mixture while contacting it with air, whereby said aerobic microorganisms are caused to be activated,
   the improvement which comprises subjecting a part of the product of step c. to fermentation by thermophilic microorganisms at a temperature of higher than 40° C. for more than 5 hours, and recycling the thus treated product with fresh raw materials to step a., the recycled amount of product of step c. being 5 to 60 weight % of the total amount of manufactured product.

2. Method for manufacturing of organic fertilizers according to claim 1, wherein the waste containing organic materials is livestock excrement, sewage sludge, or wet garbage.

3. Method for manufacturing of organic fertilizers according to claim 1, or claim 2, wherein a pH adjusting agent is added to said waste or mixture to adjust pH of said waste or mixture to a range of 6–9.

* * * * *